(12) United States Patent
Bodda et al.

(10) Patent No.: US 9,785,918 B2
(45) Date of Patent: Oct. 10, 2017

(54) PREDICTING THE SEVERITY OF AN ACTIVE SUPPORT TICKET

(71) Applicants: Gabriele Bodda, Palo Alto, CA (US); Ryan Currier, Palo Alto, CA (US); Venkitesh Subramanian, Palo Alto, CA (US); Prerna Makanawala, Mountain View, CA (US); Rei Kasai, Palo Alto, CA (US); Devasena Rajamohan, Palo Alto, CA (US); Amith Manoharan Chithambaram, Palo Alto, CA (US); Terence Chesire, Palo Alto, CA (US); Kiran Karadi, Palo Alto, CA (US)

(72) Inventors: Gabriele Bodda, Palo Alto, CA (US); Ryan Currier, Palo Alto, CA (US); Venkitesh Subramanian, Palo Alto, CA (US); Prerna Makanawala, Mountain View, CA (US); Rei Kasai, Palo Alto, CA (US); Devasena Rajamohan, Palo Alto, CA (US); Amith Manoharan Chithambaram, Palo Alto, CA (US); Terence Chesire, Palo Alto, CA (US); Kiran Karadi, Palo Alto, CA (US)

(73) Assignee: SAP SE, Walldorf (DE)

( * ) Notice: Subject to any disclaimer, the term of this patent is extended or adjusted under 35 U.S.C. 154(b) by 404 days.

(21) Appl. No.: 14/491,594

(22) Filed: Sep. 19, 2014

(65) Prior Publication Data

US 2015/0347906 A1 Dec. 3, 2015

Related U.S. Application Data

(60) Provisional application No. 62/006,791, filed on Jun. 2, 2014.

(51) Int. Cl.
*G06Q 10/00* (2012.01)

(52) U.S. Cl.
CPC .................................. *G06Q 10/20* (2013.01)

(58) Field of Classification Search
None
See application file for complete search history.

(56) References Cited

U.S. PATENT DOCUMENTS

| | | | |
|---|---|---|---|
| 7,099,942 B1 * | 8/2006 | Wilson | H04L 43/0817 709/223 |
| 2011/0270770 A1 * | 11/2011 | Cunningham | G06Q 30/016 705/304 |
| 2012/0226518 A1 * | 9/2012 | Haddad | G06Q 10/06 705/7.28 |
| 2013/0051239 A1 * | 2/2013 | Meredith | H04W 16/18 370/241 |

* cited by examiner

*Primary Examiner* — Alan Chen
(74) *Attorney, Agent, or Firm* — Fountainhead Law Group P.C.

(57) ABSTRACT

An issue tracking system capable of predicting the likelihood that an outcome of interest will occur during the lifecycle of an active support ticket. The likelihood can be represented as a severity index score. The issue tracking system can apply a predictive algorithm on attributes of the active support ticket to generate the severity index score. The predictive algorithm to use can depend on the outcome of interest while the correlation factors used to configure the predictive algorithm can depend on support tickets that have already been completed.

20 Claims, 9 Drawing Sheets

PREDICTING THE SEVERITY OF AN ACTIVE SUPPORT TICKET

CROSS-REFERENCE TO RELATED APPLICATION

The instant nonprovisional patent application claims priority to U.S. Provisional Patent Application No. 62/006,761, filed Jun. 2, 2014 and incorporated by reference in its entirety herein for all purposes.

BACKGROUND

Business entities that offer products or services often need to provide support to customers for issues that arise from use of the products or services. These issues can be tracked using an issue tracking system. An issue tracking system is a computer software package configured to manage and maintain reported issues with the products or services. A customer support representative or the customer themselves can create a support ticket in the issue tracking system for each reported issue. As a technician or customer support representative works on resolving the issue, he or she can update the support ticket as progress is made.

Typically, a customer has expectations when it comes to the level of support that the business entity will provide in resolving issues with the product or service. These expectations can come from express warranties, implied warranties, a service plan, or other guarantee or promise provided by the business entity. If an issue is not resolved appropriately or within the appropriate amount of time, a customer can escalate the support ticket by notifying a superior within the business entity, having the business entity pay fines, or filing a lawsuit against the business entity. For example, a customer can have a service plan with the business entity that states all issues will be resolved within 48 hours. If a support ticket is not resolved within that window of time, the business entity may be penalized.

This issue becomes more acute in a large business entity that generates thousands of support tickets a day since each support ticket has the potential to be escalated. As the number of support tickets increase, the business entity will have difficulty minimizing the fines or liability that is inherent when resolving support tickets.

SUMMARY

In one embodiment, a computer-implemented method identifies an outcome of interest related to support tickets created to report issues with a product or service. The method then retrieves from a predictive analysis engine, a plurality of correlation factors that are correlated with the outcome of interest. The method continues by retrieving an active support ticket. The method then applies a predictive algorithm to the active support ticket to generate a severity index score configured to measure the likelihood that the outcome of interest will result during the lifecycle of the active support ticket, wherein the predictive algorithm is configured using the plurality of correlation factors.

In one example, the plurality of correlation factors are ranked. In another example, each of the correlation factors is an attribute configurable on the support tickets. In another example, further comprises selecting the predictive algorithm according to the outcome of interest. In yet another example, the method further comprise detecting a change to the active support ticket and reapplying the predictive algorithm to the active support ticket to regenerate the severity index score. In yet another example, the predictive analysis engine generates the plurality of correlation factors by analyzing completed support tickets. In yet another example, the method further comprises determining that the severity index score is above a predefined threshold and issuing a notification alert to report the likelihood that the active support ticket will result in the outcome of interest in response to the determination.

In another embodiment, a non-transitory computer readable storage medium identifies an outcome of interest related to support tickets created to report issues with a product or service, retrieves from a predictive analysis engine, a plurality of correlation factors that are correlated with the outcome of interest, retrieves an active support ticket and applies a predictive algorithm to the active support ticket to generate a severity index score configured to measure the likelihood that the outcome of interest will result during the lifecycle of the active support ticket, wherein the predictive algorithm is configured using the plurality of correlation factors.

In another embodiment, a computer implemented system comprises one or more computer processors and a non-transitory computer-readable storage medium. The non-transitory computer-readable storage medium comprises instructions, that when executed, control the one or more computer processors to be configured for identifying an outcome of interest related to support tickets created to report issues with a product or service retrieving, from a predictive analysis engine, a plurality of correlation factors that are correlated with the outcome of interest, retrieving an active support ticket, and applying a predictive algorithm to the active support ticket to generate a severity index score configured to measure the likelihood that the outcome of interest will result during the lifecycle of the active support ticket, wherein the predictive algorithm is configured using the plurality of correlation factors.

The following detailed description and accompanying drawings provide a better understanding of the nature and advantages of the present disclosure.

DETAILED DESCRIPTION

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples alone or in combination with other features described below, and may further include modifications and equivalents of the features and concepts described herein.

Figure 1:
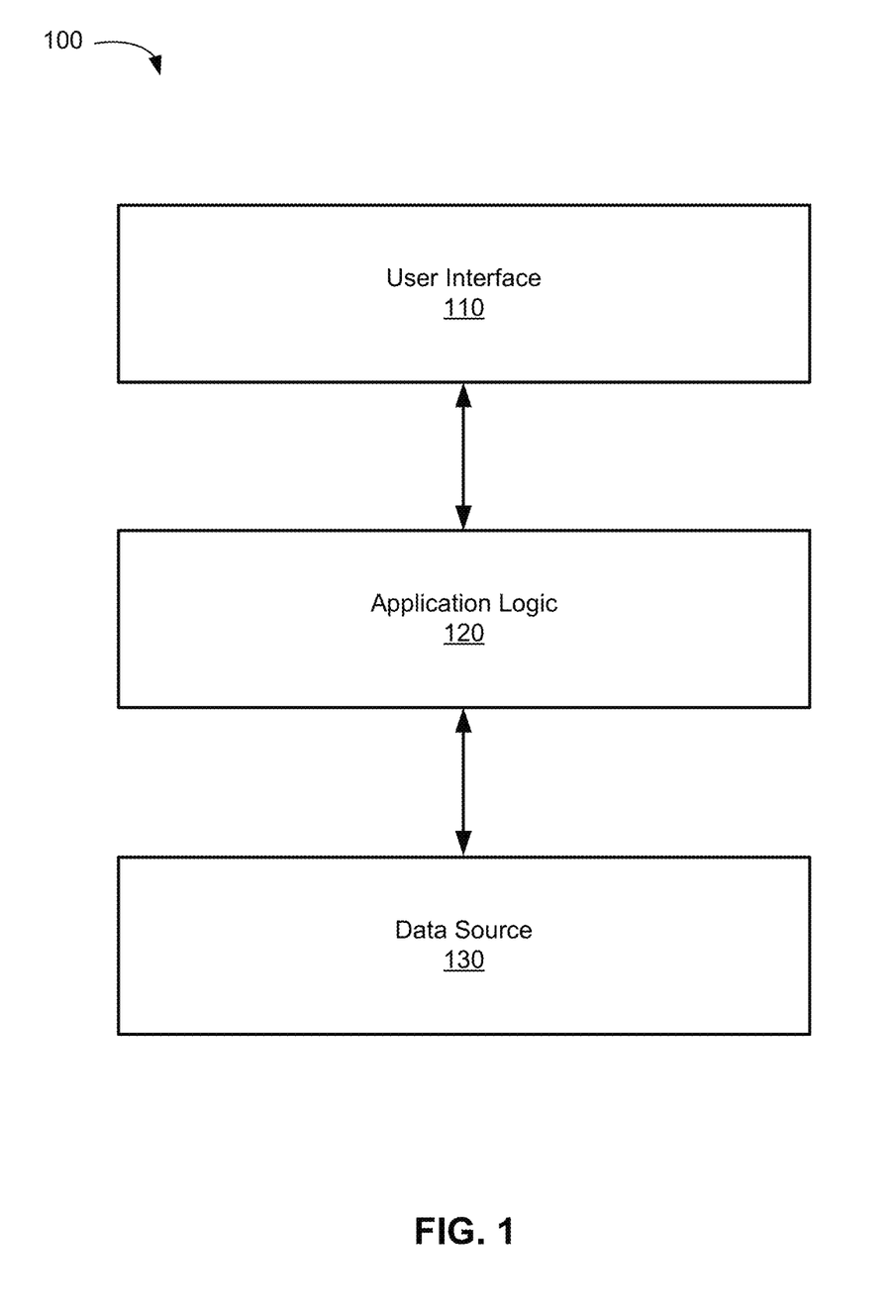
FIG. 1 illustrates a high level system according to one embodiment.

FIG. 1 illustrates a high level system 100 according to one embodiment. System 100 is an application implemented in computer code that can be executed on the server side, the client side, or a combination of both. In one embodiment, system 100 is executed using a plurality of computers communicating with one another via the Internet to provide an issue tracking system capable of predicting the severity of active support tickets. Each active support ticket can describe an unresolved issue that a customer or employee is having with a sales item offered by the business entity. A sales item can be a product or service that is placed on sale or available for license. For example, a product for sale can be a pharmaceutical drug, a laundry machine, or a computing device, a service for sale can be housekeeping services, and a product for license can be a software license for a software application. The support ticket can remain in an active state until the issue has been resolved or until the issue is no longer being handled by customer support. At this point, the state of the support ticket can change from active to completed.

For each active support ticket, the issue tracking system can generate a severity index score. The severity index score represents the likelihood that an outcome of interest will result during the lifecycle of the support ticket. If there are multiple possible outcomes for the support ticket, each possible outcome can be associated with its own severity index score. In one embodiment, the severity index score can provide managers predictions on whether certain issues (i.e., outcomes of interest) will arise during the lifecycle of a support ticket. Exemplary outcomes of interest can include missed SLA (e.g., period of time that the business entity has to address an active ticket before penalties arise), customer churn, filed lawsuit, escalation to a supervisor, and others. For example if the outcome of interest is to identify support tickets that are likely to miss their SLA, the issue tracking system can generate a severity index score for each support ticket which serves as a metric on whether the support ticket will likely result in a missed SLA. A manager can use the severity index score to determine which support tickets should be assigned additional resources (such as additional support or better technicians) in order to prevent the outcome (e.g., missed SLA) from occurring. As a result, the outcome of interest may occur less frequently, thus improving metrics that describe the performance of the manager.

System 100 includes user interface layer 110, application logic layer 120, and data source layer 130. Data source layer 130 includes a variety of data sources containing data that is analyzed by sales tools stored in application logic layer 120. In one example, data source layer 130 includes data about a company. This can include active support tickets, completed support tickets, predictive algorithms used to calculate severity index scores, information about the sales force of the company, information about the sales items that the company offers for sale, and information about customers of the company. In other examples, other types of data related to the company, competing companies, sales items, and customers can be stored in data source layer 130. For instance, news related to sales items (e.g., recalls, updates to FDA approval, etc.) and customers (e.g., upcoming IPOs, lawsuits, etc.) can also be a part of data source 130. In some embodiments, the data sources that make up data source layer 130 can be stored both locally and remotely. For example, support tickets which are sensitive to the company can be stored and managed in local databases that belong to the company while non-sensitive company information can be periodically retrieved from a remote source.

Application logic layer 120 is coupled to data source layer 130. Application logic layer 120 includes one or more sales tools that can analyze the collective knowledge available from data source layer 130 to predict the outcome of a support ticket. In one embodiment, a sales tool can predict the severity of a support ticket to help a manager identify high profile support tickets.

User interface layer 110 is coupled to application logic layer 120. User interface layer 110 can receive user input for controlling a sales tool in application logic layer 120. User interface layer 110 can interpret the user input into one or more instructions or commands which are transmitted to application logic layer 120. Application logic layer 120 processes the instructions and transmits the results generated from application logic layer 120 back to user interface layer 110. User interface layer 110 receives the results and presents the results visually, audibly, or both. In one embodiment, user interface layer 110 can present a landing page that presents information related to the severity of active support tickets, completed support tickets, or a combination of both. The status of the support tickets can be monitored. Optionally, tasks can be performed on the support tickets from the landing page.

As the support ticket goes through the different phases of a support ticket lifecycle, application logic layer 120 can generate a different severity index score for the support ticket. This is due to the fact that attributes of the support ticket can change throughout the lifecycle of the support ticket. In some embodiments, system 100 can periodically recalculate the severity index score for one or more support tickets. For example, the severity index score can be regenerated on a predefined interval or when a change is detected on the attributes of a support ticket.

Figure 2:
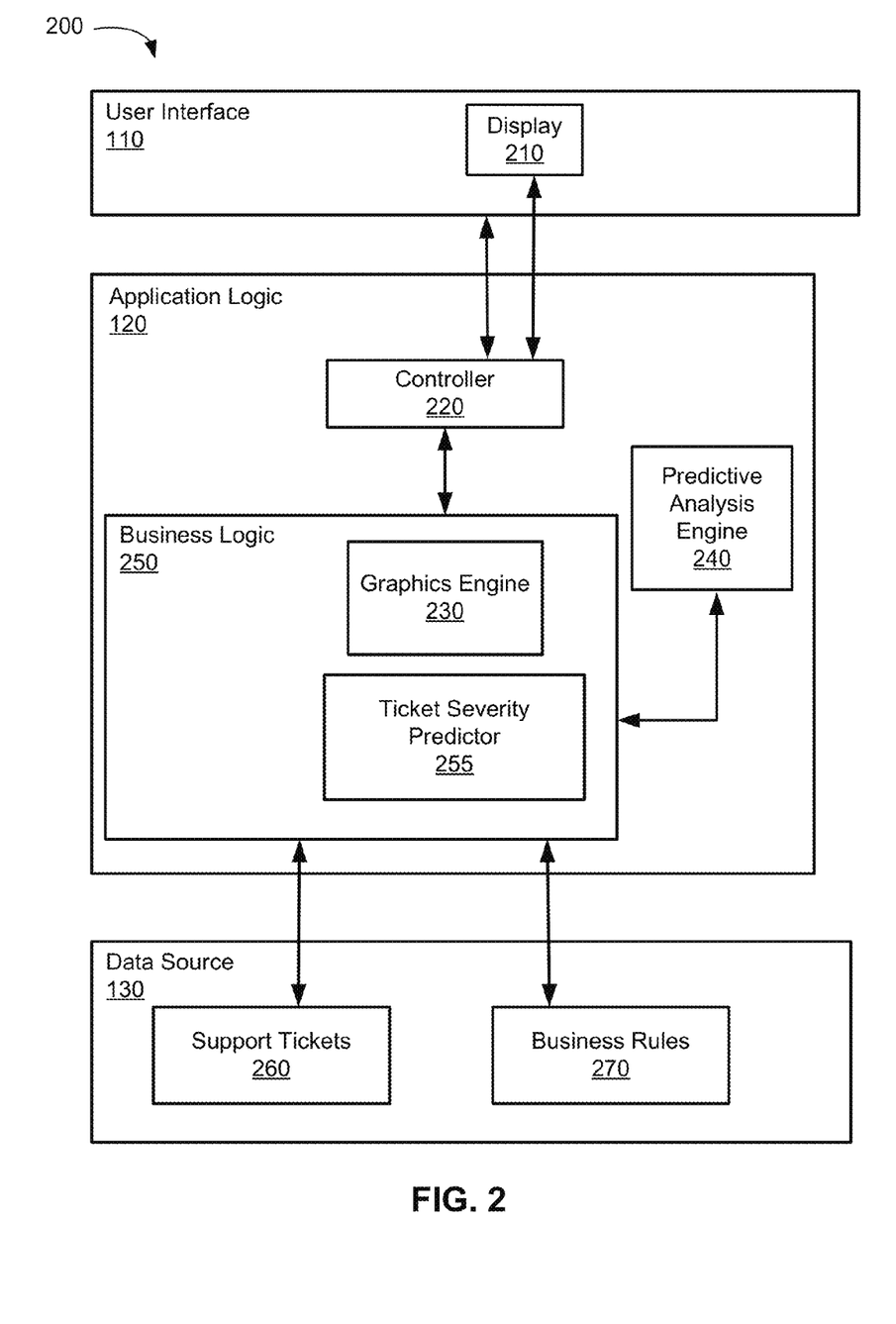
FIG. 2 illustrates a system according to one embodiment.

FIG. 2 illustrates a system 200 according to one embodiment. System 200 is an application implemented in computer code that can be executed on the server side, the client side, or both. For example, user interface 110 can be executed on the client while application logic 120 and data source 130 can be executed on one or more servers. Application logic 120 includes controller 220, predictive analysis engine 240, and business logic 250. Controller 220 is configured to control the operations of system 200. Controller 220 receives user input from user interface 110 and translates the user input into a command which is communicated to business logic 250. A procedure from business logic 250 that corresponds with the command can be called by controller 220 to process the command. In one embodiment, a command can call upon ticket severity predictor 255 of business logic 250. In another embodiment, a command can call upon graphics engine 230 of business logic 250.

Ticket severity predictor 255 can communicate with data source 130 to predict the severity of a support ticket. More specifically, ticket severity predictor 255 can retrieve data from support tickets 260 for analysis. Support tickets 260 can store active support tickets and completed support tickets. Each support ticket can represent a problem with a sales item offered by the business entity. The problem can be reported by an employee or a customer of the business entity. In one embodiment, predictive analysis engine 240 can identify correlation factors which are used to configure a predictive algorithm stored in business rules 270. Business rules 270 can store a variety of predictive algorithms that can be executed by system 200 to generate severity index scores. Depending on the type of analysis to be performed, ticket severity predictor 255 can select a predictive algorithm from business rules 270.

In one embodiment, ticket severity predictor 255 can select a predictive algorithm from business rules 270 based on the outcome of interest that the manager is trying to predict. Each outcome of interest can correspond to a predictive algorithm that is used to predict the outcome of interest. In some examples, a predictive algorithm can correspond to one or more outcomes of interest. System 200 can execute the selected predictive algorithm to generate a severity index score for active support tickets. Graphics engine 230 can process the severity index scores so that they may be presented as a graph or chart. In one embodiment, support tickets that have been predicted as having a high likelihood of generating the outcome of interest during the lifecycle of the support ticket can be identified. A support ticket can be assigned a severity index score based on the attributes of the support ticket. Depending on the severity index score, the support ticket can be identified as being high severity, middle severity, or low severity.

Graphics engine 230 can be called upon to generate charts or graphs to present results generated by ticket severity predictor 255. The generated charts or graphs can be communicated to user interface 110 for presentation on display 210.

Figure 3:
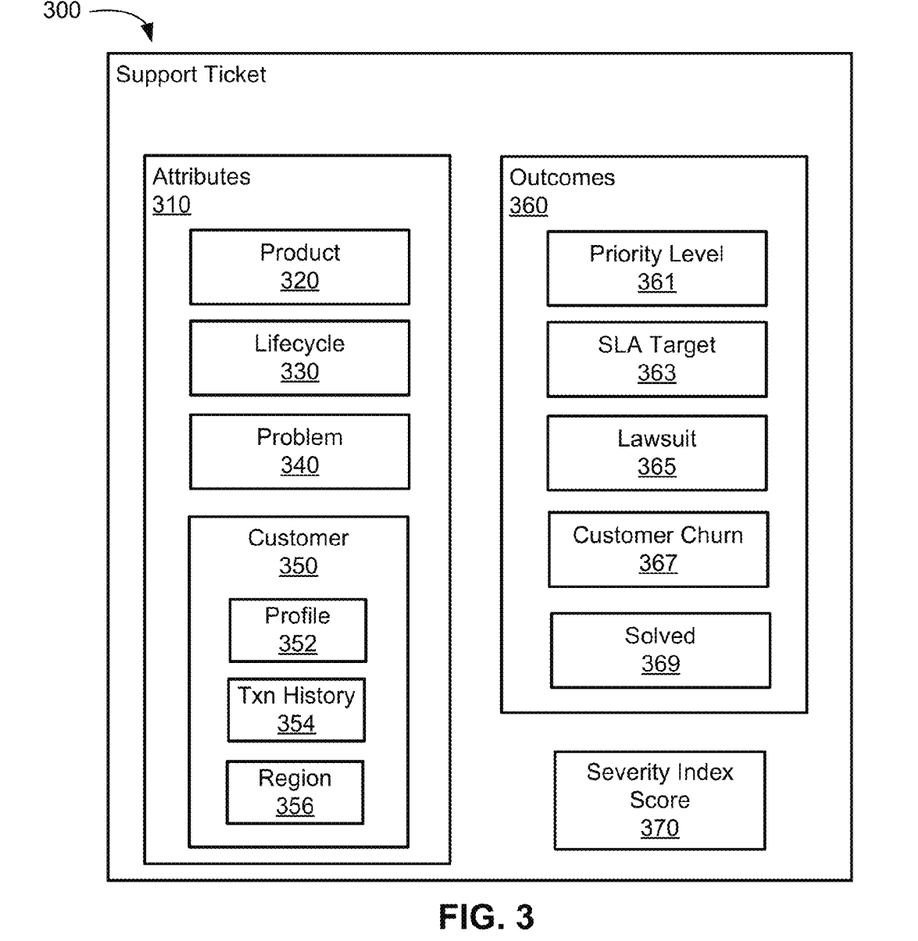
FIG. 3 illustrates an exemplary support ticket according to one embodiment.

FIG. 3 illustrates an exemplary support ticket according to one embodiment. Support ticket 300 includes attributes 310, outcomes 360, and severity index score 370. Attributes 310 can store information relevant to the problem that support ticket is trying to resolve. In some embodiments, support ticket 300 can include one or more of attributes including product 320 which contains details about the sales item that the support ticket is being created for, lifecycle 330 which contains details about the lifecycle of the support ticket, problem 340 which contains details describing the problem that the support ticket is attempting to address, and customer 350 which contains details on the customer (or employee) that created the support ticket.

In one embodiment, product 320 can include an identifier for the sales item that is seeking support. Each sales item associated with the business entity can have a corresponding identifier that is used to distinguish the sales item from other sales items. The identifier can be unique for each type of sales item (e.g., all dishwashers that are the same model have the same unique identifier) or can be unique for each sales item (e.g., all dishwashers that are the same model have a different unique identifier).

In one embodiment, lifecycle 330 can store information related to the lifecycle of support ticket 300. This can include tracking the date and time information associated with different stages of the lifecycle of support ticket 300. For example, the date and time that the support ticket enters or exits each stage of the support ticket lifecycle can be stored and tracked in lifecycle 330. In other examples, details on each stage of the support ticket lifecycle can also be stored and tracked in lifecycle 330.

Figure 4:
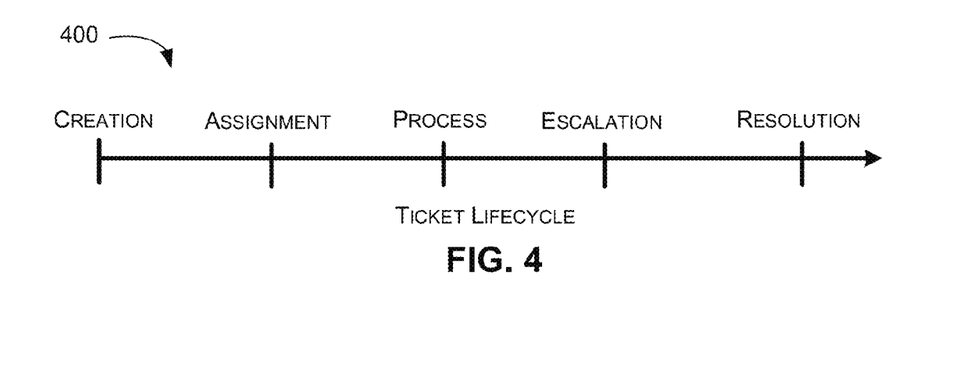
FIG. 4 illustrates an exemplary support ticket lifecycle according to one embodiment.

FIG. 4 illustrates an exemplary support ticket lifecycle according to one embodiment. Ticket lifecycle 400 begins with the creation stage where the support ticket is generated. The support ticket can be generated by a system such as system 200 of FIG. 2 or a third party system in response to a customer request. After the support ticket is created, ticket lifecycle 400 can continue to the assignment stage where the support ticket is assigned to one or more parties who are responsible for resolving issues or problems that are described within the support ticket. The responsible parties can change during the lifecycle of the support ticket. For example, a first technician can be at first assigned to the support ticket. At a later point in time, a second technician can take ownership of the support ticket from the first technician. After the support ticket is assigned, ticket lifecycle 400 can continue to the process stage where the party or parties assigned to the support ticket can process the support ticket. Processing can include applying one or more solutions to the sales item to try and solve the issues or problems described in the support ticket. As the support ticket is processed, the assigned party can update the status of the support ticket. In some examples, ticket lifecycle 400 can continue to a stage during processing where the support ticket is escalated. Escalation of the support ticket can occur when the customer creating the support ticket is unhappy with how the support ticket is being handled by the assigned party and escalates the support ticket. The escalation stage can include changing one or more properties of the support ticket. For example, a status attribute of a support ticket can be upgraded from one priority to another, selected from the set of low priority, normal priority, and high priority. After the processing stage, ticket lifecycle 400 can enter the resolution stage. In the resolution stage, the issues or problems within the support ticket have been addressed to the satisfaction of the customer. At this time, the support ticket can change state from active to completed.

Returning to FIG. 3, attributes 310 can include problem 340. Problem 340 includes details on the problem or issue which the support ticket is attempting to address. For example, problem 340 can include one or more fields that store the type of problem (e.g., warranty issue, customer service call, repair, recall, etc.), a description of the problem, or solutions that have been attempted by the customer Attributes 310 can also include customer 350. Customer 350 stores customer information which can include profile 352, transaction history 354, and region 356. Profile 352 can store a profile of customer 350. The profile can include the customer's name, address, billing information, service coverage, licensing information, and others. Transaction history 354 can store the transaction history of support tickets that customer 350 has created. This can include a summary of the support tickets that the customer has opened and completed plus the outcomes that resulted from the completed support tickets. Region 356 can identify the geographical region which the customer resides in. The geographical region can be useful in determining whether a geographical region experiences more support tickets than other regions.

Besides attributes 310, support ticket 300 further includes outcomes 360. As a support ticket is processed, certain outcomes can result from the processing. For example, processing the support ticket can escalate the support ticket to a higher priority, result in a customer taking his or her business away from the business entity (i.e., customer churn), or even worse can result in a lawsuit filed against the business entity. Outcomes 360 can describe the outcomes that resulted from processing support ticket 300. As support ticket 300 is processed by a technician or a customer support representative, outcomes 360 can change throughout the lifecycle of support ticket 300. In some embodiments, outcome 360 can include priority level 361 which describes the importance of support ticket 300. When support ticket is escalated by a customer due to a customer calling in to complain or speaking with a supervisor, the system can escalate priority level 361. Support tickets which have an escalated priority level when the support ticket has reached resolution can be considered support tickets that were troublesome.

Outcomes 360 can further include SLA target flag 363. SLA target flag 363 can define whether then problem associated with support ticket 300 was solved within the period of time defined in the customer's service agreement with the business entity. Some customer's may have an agreement with the business entity that all support tickets will be resolved within a week of creating the support ticket while other customers who have a better service agreement with the business entity may have an agreement with the business entity that all support tickets will be resolved within 72 hours of creating the support ticket. A support ticket where the problem was resolved before missing the SLA target can have a SLA target flag 363 set to false while a support ticket where the problem was not resolved before missing the SLA target can have SLA flag 363 set to true, or vice versa.

Outcomes 360 further include lawsuit 365. Lawsuit 365 can be a field configured to store information related to lawsuits that have been filed against the business entity as a result of processing support ticket 300. Outcomes 360 can further include customer churn 367. Customer churn 367 can store information related to whether business from the customer has declined as a result of how the business entity has handled support ticket 300. For example customer churn 367 can track whether the customer has reduced business with the business entity or whether the customer is no longer a customer of the business entity. Outcomes 360 can further include solved field 369. Solved field 369 can be a flag that is used to determine whether support ticket 300 has been resolved. Some support tickets can be closed after a period of time where the support ticket has not been solved or when the problem is solved.

Support ticket 300 can further include severity index score 370. Severity index score 370 can store one or more severity index scores. Each severity index score can correspond to a potential outcome and describe the likelihood that the potential outcome will occur during the lifecycle of support ticket 300. Some of the outcomes can be potential issues that can arise while processing support ticket 300. For example as described above, the outcomes can include missing an SLA target, an escalated priority level, or a lawsuit. Other outcomes can be related to the consequences from processing support ticket 300. For example, a potential consequence is that support ticket 300 is solved. A manager can analyze severity index score 370 to determine what outcomes will likely result from processing the support ticket 300. In other examples, system 200 can analyze the severity index scores of different support tickets to identify support tickets which should be brought to the manager's attention since there is a high likelihood that issues will arise during processing of the identified support tickets.

Figure 5:
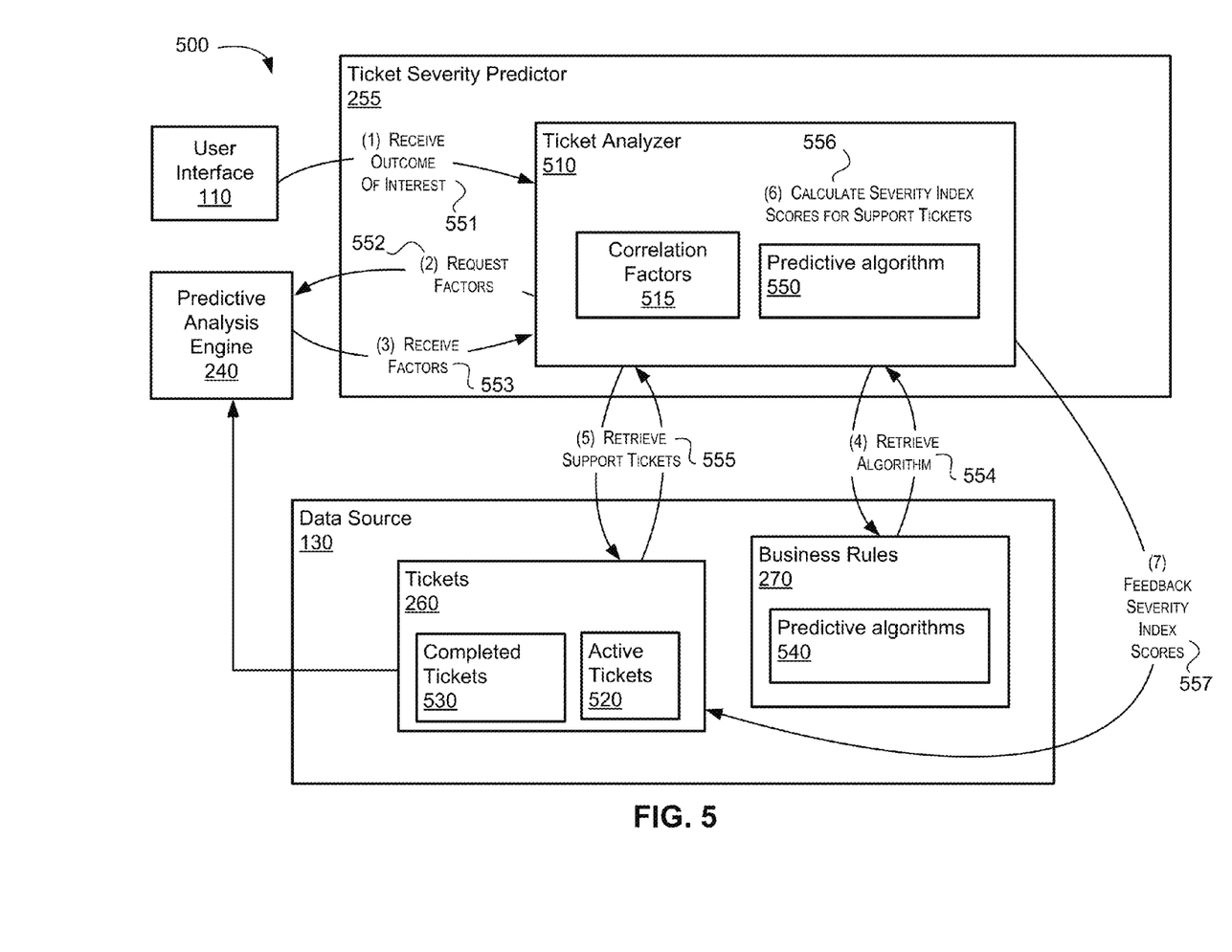
FIG. 5 depicts a workflow for generating severity index scores according to one embodiment.

FIG. 5 depicts a workflow for generating severity index scores according to one embodiment. Workflow 500 includes ticket severity predictor 255 which includes ticket analyzer 510. Ticket analyzer 510 is configured generate severity index scores for active support tickets. System 500 further includes user interface 110, predictive analysis engine 240, and data source 130. Data source 130 includes tickets 260 which can contain completed tickets 530 and active tickets 520. Data source 130 also includes business rules 270 which includes predictive algorithms 540.

Workflow 500 begins with ticket severity predictor 550 receiving an outcome of interest from user interface 110 at step (1) (reference numeral 551). The outcome of interest can be specified by the manager. For example, the manager may be interested in determining the likelihood that active support tickets will missing an SLA target or the likelihood that active support tickets will be solved. After receiving the query, ticket severity predictor 255 can request correlation factors from predictive analysis engine 240 at step (2) (reference numeral 552). Predictive analysis engine 240 can be configured to identify correlation factors. Correlation factors are attributes of the support ticket that are most highly correlated to the outcome of interest. Predictive analysis engine 240 can identify the correlation factors by analyzing completed support tickets 530. For example, completed support tickets having the outcome of interest can be analyzed to identify patterns or similarities between them. For instance, an attribute that appears frequently in the completed support tickets can be identified as a correlation factor for the outcome of interest. In one embodiment, predictive analysis engine 240 can identify a predefined number of correlation factors. In another embodiment, the correlation factors can be ranked. For example, the attribute which the highest correlation with outcome of interest can be ranked first while the attribute with the second highest correlation with the outcome of interest can be ranked second.

Ticket severity predictor 255 can receive correlation factors 115 as a response to the request at step (3) (reference numeral 553). Once correlation factors 115 have been received, ticket severity predictor 255 can retrieve predictive algorithm 550 from business rules 270 at step (4) (reference numeral 554). Predictive algorithm 550 can be used to generate a severity index score for active support tickets that describes the likelihood that an outcome of interest will occur during the lifecycle of the active support ticket. More specifically, predictive algorithm 550 can define the equation for calculating the severity index score. The equation can define how the correlation factors are used when calculating the severity index score. This can include the weighting for each correlation factor. An exemplary predictive algorithm can be "severity index score=((correlation factor 1)×60)+((correlation factor 2)×30)+((correlation factor 3)×10)." As shown, the correlation factors can be weighted. If an active support ticket has "correlation factor 1" as an attribute, the predictive algorithm adds 60 points to the severity index score. Similarly if the active support ticket has "correlation factor 2" as an attribute, the predictive algorithm adds 30 points to the severity index score. The severity index score can range from zero to 100. In other examples, the predictive algorithm can define other mathematical operations (such as subtract or multiply) be performed on the severity index score based on the existence of a correlation factor in the active support ticket. In one embodiment, predictive algorithm 550 can be retrieved according to the outcome of interest that was previously received in step (1).

After retrieving predictive algorithm 550, ticket severity predictor 255 can pass predictive algorithm 550 and correlation factors 515 to ticket analyzer 510 for calculation of severity index scores for the outcome of interest. At step (5) (reference numeral 555), ticket analyzer 510 can retrieve active support tickets from data source 130. In one embodiment, ticket analyzer 510 can apply one or more constraints when retrieving active support tickets. For example, active support tickets can be retrieved from within a predefined window of time. As another example, active support tickets can be limited to support tickets of a given type (e.g., question, warranty coverage, repair, etc.). Each active support ticket retrieved can be processed by ticket analyzer 510 to calculate a severity index score at step (6) (reference numeral 556). Processing can include determining which correlation factors are present in the active support ticket and calculating the severity index score based on the correlation factors that are present. In some embodiments, ticket severity predictor 255 can issue an alert when the calculated severity index score is above a predefined threshold.

Once the severity index score has been calculated, ticket severity predictor 255 can feedback the severity index score to data source 130 for storage on the active support ticket at step (7) (reference numeral 557). In some embodiments, workflow 500 can be performed asynchronously. For example, workflow 500 can be performed when a manager submits a request to query an outcome of interest. In other embodiments, workflow 500 can be performed synchronously. For example, workflow 500 can be performed in response to detecting a change to support tickets 260 or on a predefined interval.

In some embodiments, ticket severity predictor 255 can generate a severity index score for each potential outcome of interest. As a result, an active support ticket can store a severity index score for each potential outcome of interest. By pre-processing the active support tickets in this manner, system 200 can respond to user requests in a shorter period of time since the severity index score for a given outcome of interest can be retrieved from the active support ticket rather than calculated at the time of the user request. While the embodiments above discuss the scenario of active support tickets, it would be understood by those of skill in the art that the techniques can also be applied to completed support tickets.

Figure 6:
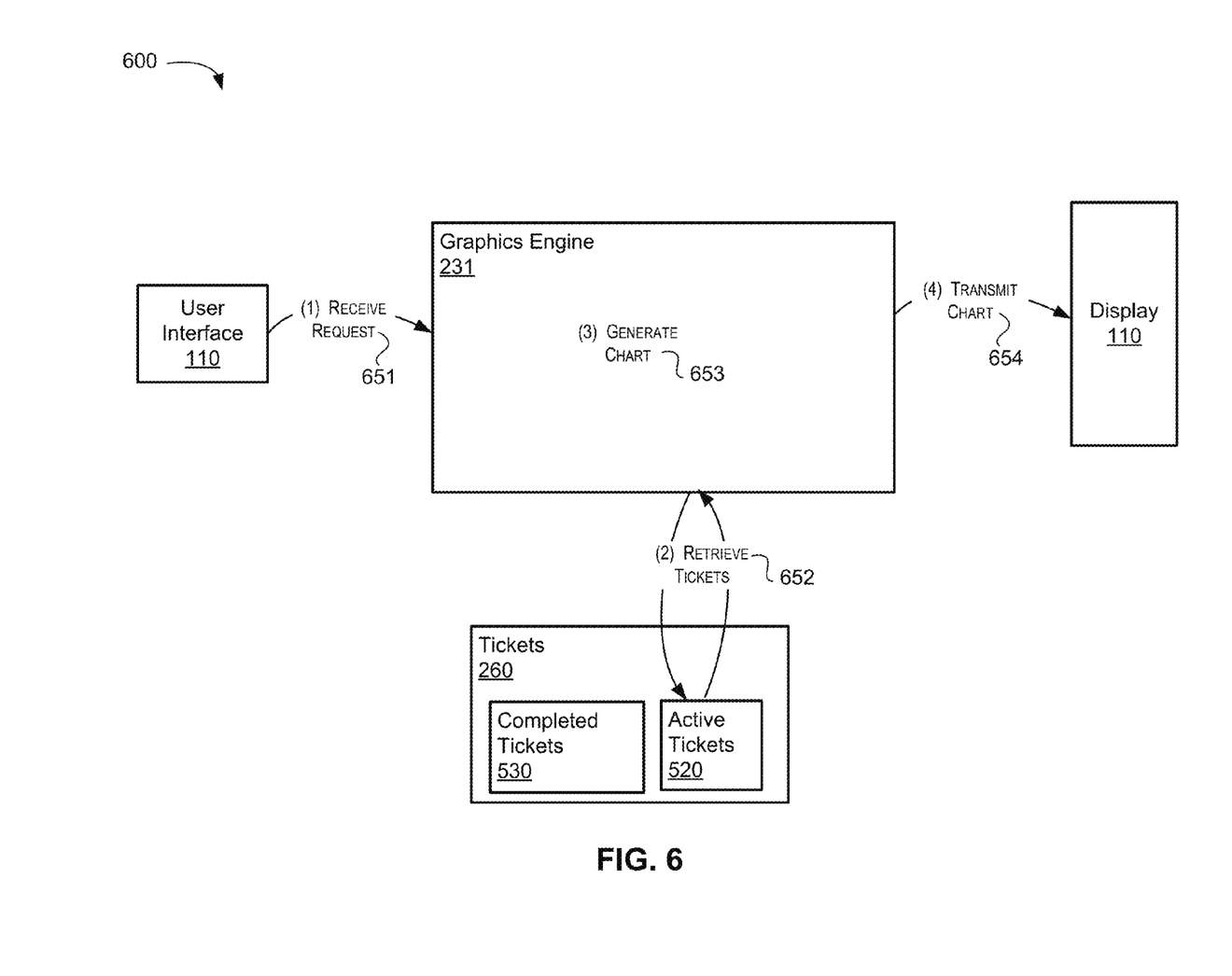
FIG. 6 depicts a workflow for generating a chart to present attributes of active support tickets according to one embodiment.

FIG. 6 depicts a workflow for generating a chart to present attributes of active support tickets according to one embodiment. For example, workflow 600 can be utilized to generate a chart that presents severity index scores of active support tickets. Workflow 600 begins with graphics engine 231 receiving a request from user interface 110 at step (1) (reference numeral 651). The request can be to identify active support tickets that likely will cause an outcome of interest or a request to present a chart related to an outcome of interest. In some examples, the request can include constraints on the active support tickets which are to be presented in the chart. For example, a type of active support ticket or a time frame can be specified. After receiving the request, graphics engine 231 can retrieve active support tickets from active tickets 520. In one embodiment, graphics engine 231 can retrieve active support tickets according to one or more constraints. The constraints can be predefined or received from the request. Exemplary constraints can include a window of time, a type of support ticket, or a product of interest. Once the active support tickets have been retrieved (possibly according to constraints), graphics engine 231 can generate the chart at step (3) (reference numeral 653). Generating the chart can include creating a chart that presents the severity index score corresponding to the output of interest for each retrieved active support ticket. Various types of charts can be generated based on the manager's request. The manager request may specify a chart that presents the scores based on time or a chart that groups the scores based on support ticket type or product. The generated chart can be transmitted the chart to display 110 at step (4) (reference numeral 654).

In some embodiments, a manager request can specify an outcome of interest. System 200 can first process the manager request using ticket severity predictor 255 to calculate severity index scores for the active support tickets. The severity index scores that are associated with the outcome of interest can be stored on the active support tickets. System 200 can then continue processing the manager request by using graphics engine 230 to generate a chart that is able to quickly identify active support tickets that likely will result in the outcome of interest. This allows the manager to be more efficient when evaluating the active support tickets.

Figure 7A:
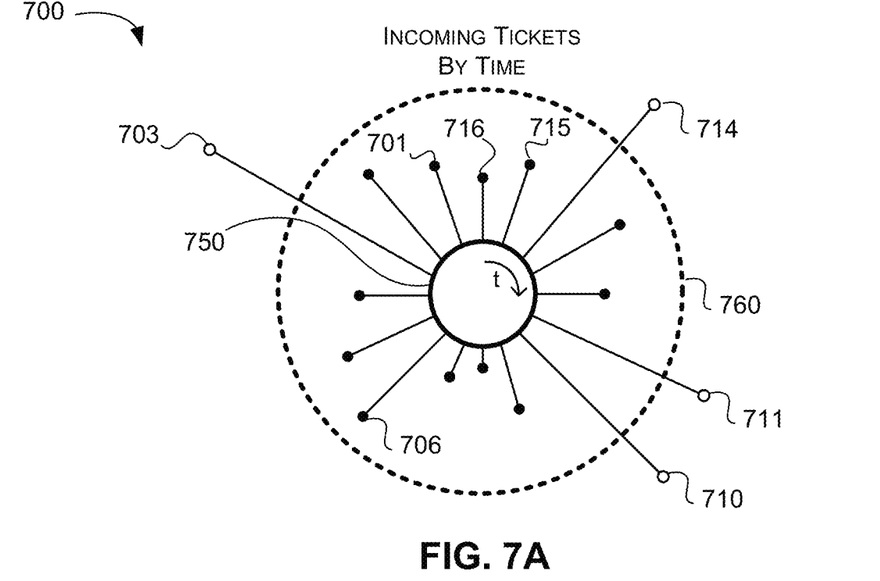
FIG. 7A illustrates a severity chart according to one embodiment.

FIG. 7A illustrates a severity chart according to one embodiment. Severity chart 700 is a graphical user interface configured to represent a plurality of active support tickets. A user can interact with the graphical user interface to learn more about the active support tickets being represented in severity chart 700. Here, each active support ticket can be represented by a line that has an origination point along the perimeter of inner FIG. 750. The ordering of the lines along the perimeter of inner FIG. 750 can depend on an attribute of the active support tickets. In this embodiment, the lines can be ordered along the perimeter of inner FIG. 750 according to the creation date of the active support tickets. As a result, the active support tickets are ordered according to their creation date and the creation dates can be all within a window of time. Here, the active support tickets that corresponds with line 715 has an older creation date than the active support ticket that corresponds with line 716 since it appears to the right of line 716. Similarly, the active support ticket that corresponds with line 701 is the oldest active support ticket and the active support ticket that corresponds with line 716 is the newest active support ticket amongst the active support tickets being represented in severity chart 700. Inner FIG. 750 can have a point along the perimeter that serves as the start point and another point that serves as the end point. If the entire perimeter of inner FIG. 750 is to be used to present lines, then the start point and the end point may be the same. Lines can enter severity chart 700 at the start point and exist severity chart 700 at the end point.

In one embodiment, the lines along the perimeter of inner FIG. 750 can be spaced depending on at least on attribute of the active support tickets. The spacing can be proportional to the differential between the values for the attribute. For example the more time that exists between the creation dates of two active support tickets, larger the spacing will be between the two lines that represent the two active support tickets. The spacing can also depend on the number of active support tickets that exist within the window of time. The more active support tickets that need to be presented, the closer the spacing between adjacent lines.

While the ordering of the lines and the spacing of adjacent lines (e.g., the proximity of one line to the next line) can depend on a first attribute of the active support tickets, the length of the line can depend on a second attribute of the active support tickets. Here, the length of each line can represent the severity index score of the active support ticket that corresponds with the line. The severity index score can be associated with an outcome of interest. An active support ticket having a higher severity index score can be represented by a longer line. As such, active support tickets that are likely to result in the outcome of interest can be represented by a longer line while active support tickets that are unlikely to result in the outcome of interest can be represented by a shorter line. In some embodiments, the length of the line can be proportional (sometimes directly proportional) to the severity index score. Here, the active support ticket that corresponds with line 716 has a smaller severity index score than the active support ticket that corresponds with line 714.

Severity chart 700 can optionally include outer FIG. 760. Outer FIG. 760 can represent a predefined threshold for the second attribute of the active support ticket. Active support tickets having a value for the second attribute that is greater than the predefined threshold can be represented by a line that extends past outer FIG. 760. By including outer FIG. 760 in severity chart 700, a user can visually identify which active support tickets have a value greater than the predefined threshold by simply scanning for the lines which extend past outer FIG. 760. The predefined threshold that is associated with outer FIG. 760 can be user defined or system defined. In some embodiments, lines that extend past outer FIG. 760 (e.g., lines that represent an active support ticket having a severity index score greater than the predefined threshold) can take on a different appearance. For example, lines 701, 716, and 715 have a solid end point while lines 714, 711, 710, and 703 have a hollow end point. While inner FIG. 750 and outer FIG. 760 are shown here as being the same shape with the same center point, this does not need to be the case. In other embodiments, inner FIG. 750 and outer FIG. 760 can be different shapes and/or have different center points. Here, severity chart 700 has presented four lines (lines 703, 710, 711, and 714) outside outer FIG. 760. A manager viewing severity chart 700 can quickly infer that there are four active support tickets that are of interest to the manager. When a line is selected, details for the active support ticket being represented by the selected line can be presented.

Figure 7B:
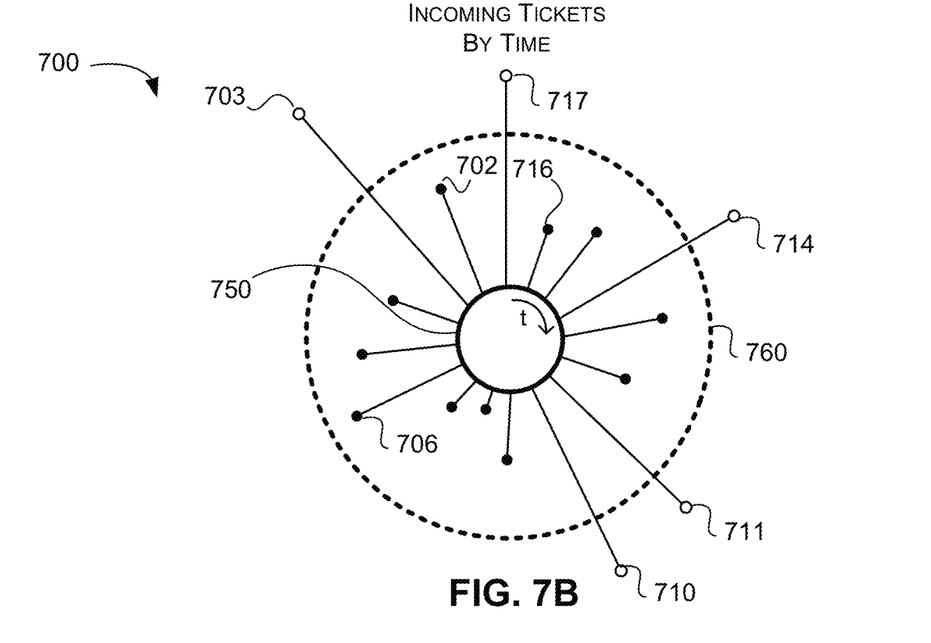
FIG. 7B illustrates an updated severity chart according to one embodiment.

FIG. 7B illustrates an updated severity chart according to one embodiment. As time passes, severity chart 700 of FIG. 7A may be out of date. For example, the creation date for an active support ticket may fall outside the window of time being shown in severity chart 700. As a result, the line that represents the older active support ticket can be removed from severity chart 700. Similarly as new active support tickets are generated that fall within the window of time, new lines that represent the new active support tickets can be added to severity chart 700.

The passage of time without a change in the severity index score can result in a repositioning of the line along the perimeter of inner FIG. 750. The line can be rotated clockwise around inner FIG. 750 as time passes. Eventually when the creation date of the active support ticket is outside the window of time represented by severity chart 700, the line that corresponds with the active support ticket can be removed from severity chart 700. Here, line 701 has been removed from severity chart 700. Similarly, line 703 has been repositioned to a new position on inner FIG. 750. A new active support ticket is within the window of time. As a result, line 717 has been generated to represent the new active support ticket. The length of the new active support ticket can depend on the severity index score of the new active support ticket.

Figure 8:
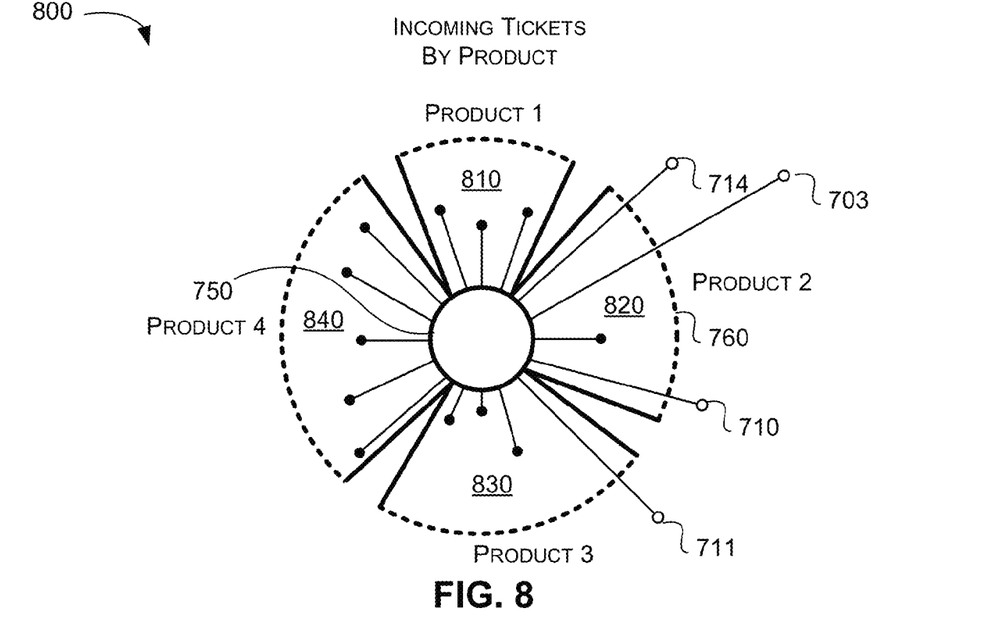
FIG. 8 illustrates another updated severity chart according to one embodiment.

FIG. 8 illustrates another updated severity chart according to one embodiment. In some embodiments, requests can come from the user to sort the active support tickets using some other criteria or attribute of the active support ticket. The graphics engine can process these requests and regenerate the severity chart. Here, a request has been received to sort the active support tickets according to the product type. In response to the request, graphics engine 230 can separate the space between inner FIG. 750 and outer FIG. 760 into four distinct segments (segment 810, 820, 830, and 840) where each segment contains lines that correspond to active support tickets that cover the same product type. As shown here, three of the four active support tickets within the window of time that have a high likelihood of generating the outcome of interest are related to product 2.

Figure 9:
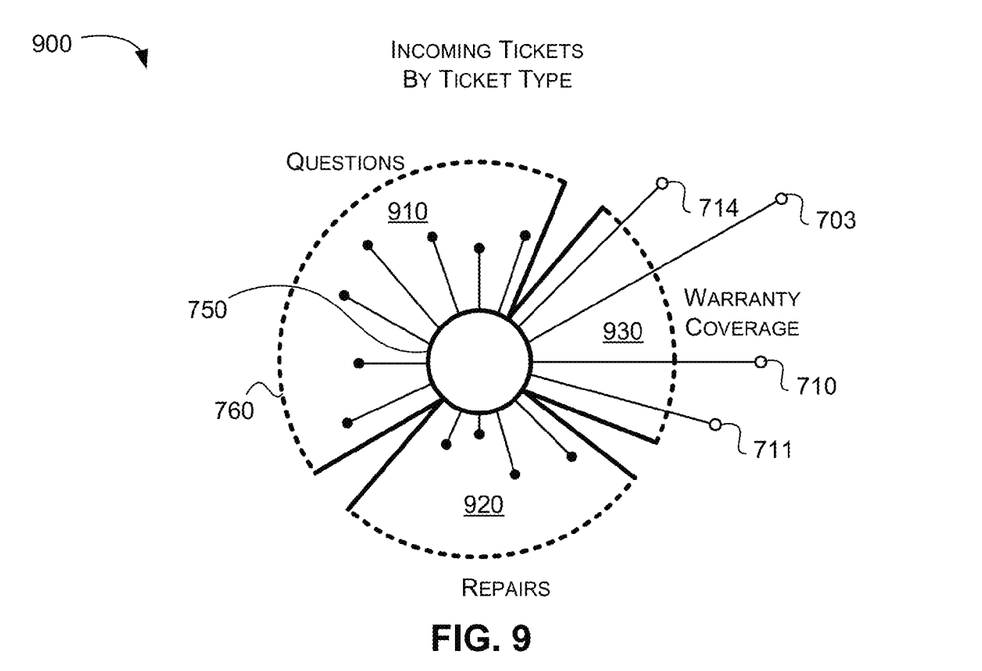
FIG. 9 illustrates another updated severity chart according to one embodiment.

FIG. 9 illustrates another updated severity chart according to one embodiment. Similar to FIG. 8, severity chart 900 is presented in response to receiving a user request to present the active support tickets grouped according to a different variable. Here, the user request is to present the active support tickets grouped according to ticket type. In response to the user request, active support tickets that are elated to questions are grouped together in segment 910, active support tickets that are related to repairs are grouped together in segment 920, and active support tickets that are related to warranty coverage are grouped together in segment 930. As shown, all the active support tickets having a severity index score greater than the predefined interval are related to warranty coverage. While FIGS. 7-9 are described as presenting a severity index score, it is understood that the same techniques can be applied to present other attributes of the active support tickets.

Figure 10:
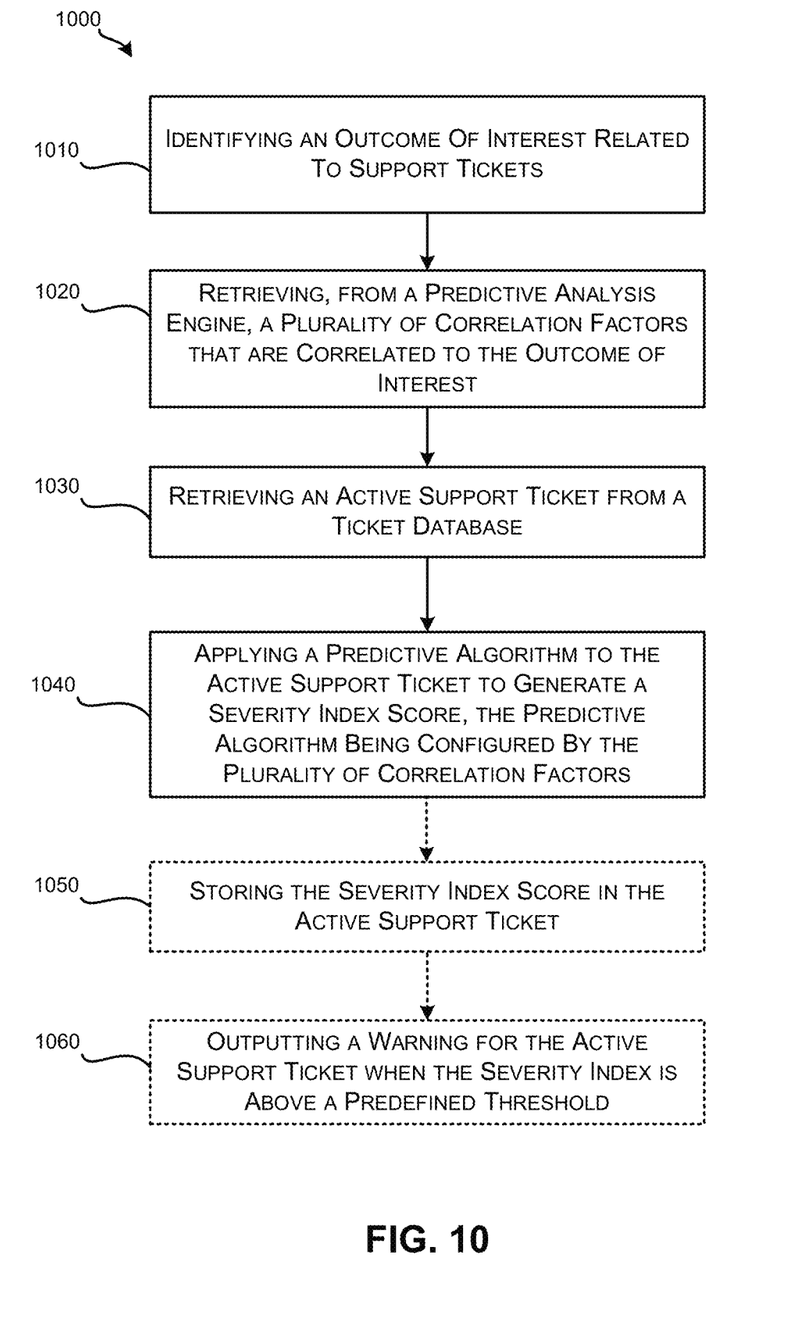
FIG. 10 illustrates a process for predicting the likelihood that an outcome of interest will occur during the lifetime of a support ticket according to one embodiment.

FIG. 10 illustrates a process for predicting the likelihood that an outcome of interest will occur during the lifetime of a support ticket according to one embodiment. Process 1000 can be stored in computer readable code and executed by a processor. For example, process 1000 can be a part of the computer readable code that describes ticket severity predictor 255 of FIG. 2. Process 1000 begins by identifying an outcome of interest related to support tickets at 1010. The outcome of interest can be identified from an instruction received by a manager or can be preset. Process 1000 then continues by retrieving from a predictive analysis engine a plurality of correlation factors that are correlated to the outcome of interest. In one embodiment, the outcome of interest can be passed to the predictive analysis engine. The predictive analysis engine can identify one or more correlation factors that are shown to have high correlation with the outcome of interest. In one example, the predictive analysis engine can analyze completed support tickets to identify the attributes of the support ticket that are highly correlated with the outcome of interest and set the identified attributes as the correlation factors. The correlation factors can optionally be ranked.

After the correlation factors are retrieved, process 1000 continues by retrieving an active support ticket from a ticket database at 1030. Process 1000 then applies a predictive algorithm to the active support ticket to generate a severity index score at 1040. The predictive algorithm can be configured using the plurality of correlation factors and can generate a severity index score that describes the likelihood of the outcome of interest occurring during the lifecycle of the active support ticket. In one embodiment, the predictive algorithm that is applied to the active support ticket can depend on the outcome of interest.

At 1050, process 1000 can optionally store the severity index score in the active support ticket. If the severity index score is above a predefined threshold, process 1000 can optionally output a warning for the active support ticket at 1060.

Figure 11:
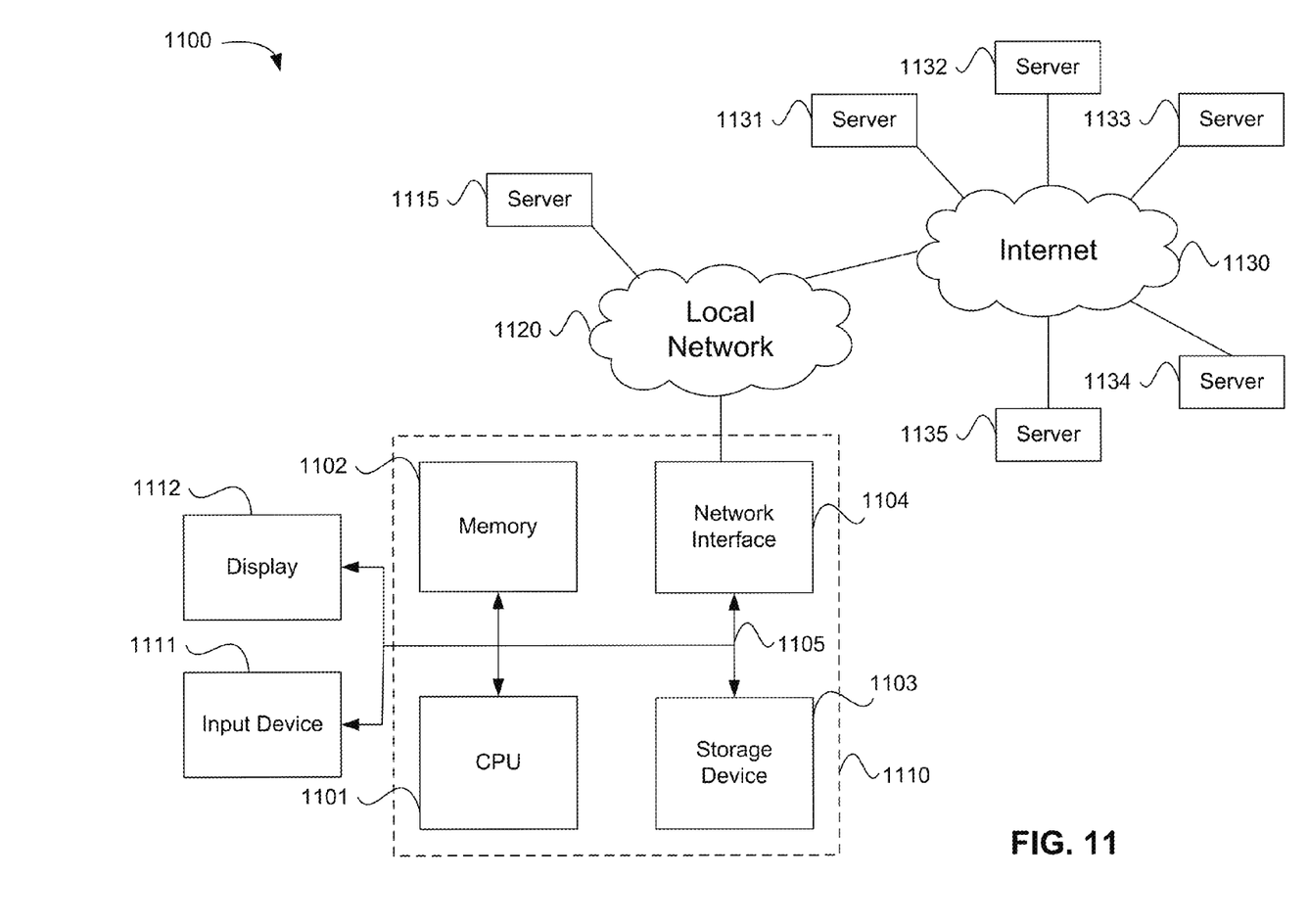
FIG. 11 illustrates an exemplary computer system according to one embodiment.

An exemplary computer system 1100 is illustrated in FIG. 11. Computer system 1110 includes bus 1105 or other communication mechanism for communicating information, and a processor 1101 coupled with bus 1105 for processing information. Computer system 1110 also includes a memory 1102 coupled to bus 1105 for storing information and instructions to be executed by processor 1101, including information and instructions for performing the techniques described above, for example. This memory may also be used for storing variables or other intermediate information during execution of instructions to be executed by processor 1101. Possible implementations of this memory may be, but are not limited to, random access memory (RAM), read only memory (ROM), or both. A storage device 1103 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 1103 may include source code, binary code, or software files for performing the techniques above, for example. Storage device and memory are both examples of computer readable mediums.

Computer system 1110 may be coupled via bus 1105 to a display 1112, such as a cathode ray tube (CRT) or liquid crystal display (LCD), for displaying information to a computer user. An input device 1111 such as a keyboard and/or mouse is coupled to bus 1105 for communicating information and command selections from the user to processor 1101. The combination of these components allows the user to communicate with the system. In some systems, bus 1105 may be divided into multiple specialized buses.

Computer system 1110 also includes a network interface 1104 coupled with bus 1105. Network interface 1104 may provide two-way data communication between computer system 1110 and the local network 1120. The network interface 1104 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 1104 sends and receives electrical, electromagnetic, or optical signals that carry digital data streams representing various types of information.

Computer system 1110 can send and receive information, including messages or other interface actions, through the network interface 1104 across a local network 1120, an Intranet, or the Internet 1130. For a local network, computer system 1110 may communicate with a plurality of other computer machines, such as server 1115. Accordingly, computer system 1110 and server computer systems represented by server 1115 may form a cloud computing network, which may be programmed with processes described herein. In the Internet example, software components or services may reside on multiple different computer systems 1110 or servers 1131-1135 across the network. The processes described above may be implemented on one or more servers, for example. A server 1131 may transmit actions or messages from one component, through Internet 1130, local network 1120, and network interface 1104 to a component on computer system 1110. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method, comprising:
   identifying, by a processor, a particular outcome of interest related to support tickets created to report issues with a product or service;
   retrieving, by the processor and from a predictive analysis engine, a plurality of correlation factors that are correlated with the outcome of interest;
   retrieving, by the processor, an active support ticket;
   upon determining that the particular outcome of interest is a first type of outcome of interest, applying, by the processor, a first predictive algorithm to the active support ticket to generate a severity index score configured to measure a likelihood that the particular outcome of interest will result during the lifecycle of the active support ticket, wherein the first predictive algorithm is configured using the plurality of correlation factors; and
   upon determining that the particular outcome of interest is a second type of outcome of interest, applying, by the processor, a second predictive algorithm to the active support ticket to generate the severity index score configured to measure the likelihood that the particular outcome of interest will result during the lifecycle of the active support ticket, wherein the second predictive algorithm is configured using the plurality of correlation factors.

2. The computer-implemented method of claim 1, wherein the plurality of correlation factors are ranked.

3. The computer-implemented method of claim 1, wherein each of the correlation factors is an attribute configurable on the support tickets.

4. The computer-implemented method of claim 1 further comprising:
   determining, by the processor, that the particular outcome of interest is one of the first type of outcome of interest and the second type of outcome of interest.

5. The computer-implemented method of claim 1 further comprising:
   detecting, by the processor, a change to the active support ticket; and
   reapplying, by the processor, the predictive algorithm to the active support ticket to regenerate the severity index score.

6. The computer-implemented method of claim 1, wherein the predictive analysis engine generates the plurality of correlation factors by analyzing completed support tickets.

7. The computer-implemented method of claim 1 further comprising:
   determining, by the processor, that the severity index score is above a predefined threshold;
   issuing, by the processor, a notification alert to report the likelihood that the active support ticket will result in the particular outcome of interest in response to the determination.

8. A non-transitory computer readable storage medium storing one or more programs, the one or more programs comprising instructions for:
   identifying a particular outcome of interest related to support tickets created to report issues with a product or service;
   retrieving, from a predictive analysis engine, a plurality of correlation factors that are correlated with the outcome of interest;

retrieving an active support ticket;

upon determining that the particular outcome of interest is a first type of outcome of interest, applying a first predictive algorithm to the active support ticket to generate a severity index score configured to measure a likelihood that the particular outcome of interest will result during the lifecycle of the active support ticket, wherein the first predictive algorithm is configured using the plurality of correlation factors; and upon determining that the particular outcome of interest is a second type of outcome of interest, applying a second predictive algorithm to the active support ticket to generate the severity index score configured to measure the likelihood that the particular outcome of interest will result during the lifecycle of the active support ticket, wherein the second predictive algorithm is configured using the plurality of correlation factors.

9. The non-transitory computer readable storage medium of claim 8, wherein the plurality of correlation factors are ranked.

10. The non-transitory computer readable storage medium of claim 8, wherein each of the correlation factors is an attribute configurable on the support tickets.

11. The non-transitory computer readable storage medium of claim 8, wherein the one or more programs further comprises instructions for:

determining that the particular outcome of interest is one of the first type of outcome of interest and the second type of outcome of interest.

12. The non-transitory computer readable storage medium of claim 8, wherein the one or more programs further comprises instructions for:

detecting a change to the active support ticket; and reapplying the predictive algorithm to the active support ticket to regenerate the severity index score.

13. The non-transitory computer readable storage medium of claim 8, wherein the predictive analysis engine generates the plurality of correlation factors by analyzing completed support tickets.

14. The non-transitory computer readable storage medium of claim 8, wherein the one or more programs further comprises instructions for:

determining that the severity index score is above a predefined threshold;

issuing a notification alert to report the likelihood that the active support ticket will result in the outcome of interest in response to the determination.

15. A computer implemented system, comprising:

one or more computer processors; and a non-transitory computer-readable storage medium comprising instructions, that when executed, control the one or more computer processors to be configured for:

identifying a particular outcome of interest related to support tickets created to report issues with a product or service;

retrieving, from a predictive analysis engine, a plurality of correlation factors that are correlated with the outcome of interest;

retrieving an active support ticket;

upon determining that the particular outcome of interest is a first type of outcome of interest, applying a first predictive algorithm to the active support ticket to generate a severity index score configured to measure a likelihood that the particular outcome of interest will result during the lifecycle of the active support ticket, wherein the first predictive algorithm is configured using the plurality of correlation factors; and upon determining that the particular outcome of interest is a second type of outcome of interest, applying a second predictive algorithm to the active support ticket to generate the severity index score configured to measure the likelihood that the particular outcome of interest will result during the lifecycle of the active support ticket, wherein the second predictive algorithm is configured using the plurality of correlation factors.

16. The computer implemented system of claim 15, wherein the plurality of correlation factors are ranked.

17. The computer implemented system of claim 15, wherein each of the correlation factors is an attribute configurable on the support tickets.

18. The computer implemented system of claim 15, wherein the instructions control the one or more computer processors to be further configured for:

determining that the particular outcome of interest is one of the first type of outcome of interest and the second type of outcome of interest.

19. The computer implemented system of claim 15, wherein the instructions control the one or more computer processors to be further configured for:

detecting a change to the active support ticket; and reapplying the predictive algorithm to the active support ticket to regenerate the severity index score.

20. The computer implemented system of claim 15, wherein the instructions control the one or more computer processors to be further configured for:

determining that the severity index score is above a predefined threshold;

issuing a notification alert to report the likelihood that the active support ticket will result in the outcome of interest in response to the determination.

* * * * *